(12) United States Patent
Sakaki

(10) Patent No.: US 7,785,099 B2
(45) Date of Patent: Aug. 31, 2010

(54) STRINGING PREVENTING MEMBER AND INJECTION MOLDING APPARATUS

(75) Inventor: Takeshi Sakaki, Saitama (JP)

(73) Assignee: Fujinon Corporation, Saitama (JP)

(*) Notice: Subject to any disclaimer, the term of this patent is extended or adjusted under 35 U.S.C. 154(b) by 198 days.

(21) Appl. No.: 12/055,039

(22) Filed: Mar. 25, 2008

(65) Prior Publication Data
US 2008/0241311 A1 Oct. 2, 2008

(30) Foreign Application Priority Data
Mar. 30, 2007 (JP) ............................ P2007-095154

(51) Int. Cl.
*B29C 45/20* (2006.01)
(52) U.S. Cl. .................... 425/549; 264/328.15
(58) Field of Classification Search ................ 425/549; 264/328.15
See application file for complete search history.

(56) References Cited

U.S. PATENT DOCUMENTS 7,175,416 B2 * 2/2007 Baresich et al. ............. 425/549

FOREIGN PATENT DOCUMENTS

JP   2001-225359 A   8/2001
JP   2004-188951 A   7/2004

* cited by examiner

*Primary Examiner*—Tim Heitbrink
(74) *Attorney, Agent, or Firm*—Birch, Stewart, Kolasch & Birch, LLP

(57) ABSTRACT

A stringing preventing member is provided and includes: a member having an opening portion through which resin injected from an injection nozzle of an injection molding apparatus is fed to a mold including a fixed mold and a movable mold; and a projection portion protruding inwardly with respect to an opening of the injection nozzle, so as to define at least a part of a contour of the opening portion. A ratio of an effective opening area of the opening portion to a surface area of an inner wall surface of the opening portion contacting with the resin at an inside of the opening potion is 0.6 or less, and a ratio of the effective opening area of the opening portion to an area of the opening of the injection nozzle is 0.6 or more.

15 Claims, 4 Drawing Sheets

FIG. 4A

| SHAPE OF OPENING PORTION | TEST RESULT | DETERMINATION |
|---|---|---|
| SIX-PRONGED FORK SHAPE <br><br> OPENING AREA SD: 9.96 mm² <br> SURFACE AREA SC: 19.43 mm² <br> SD/SC = 0.51 <br> SD/SN = 0.79 | • NO STRINGING <br> • NO VARIATION IN PEAK PRESSURE <br> • NO CHANGE IN ABERRATION | STRINGING <br> ◯ <br> PEAK PRESSURE <br> ◯ |

FIG. 4B

| SHAPE OF OPENING PORTION | TEST RESULT | DETERMINATION |
|---|---|---|
| THREE-PRONGED FORK SHAPE <br><br> OPENING AREA SD: 5.41 mm² <br> SURFACE AREA SC: 10.82 mm² <br> SD/SC = 0.50 <br> SD/SN = 0.43 | ALTHOUGH STRINGING DID NOT OCCUR, PEAK PRESSURE REACHED LIMIT VALUE → MOLDING APPARATUS IS STOPPED | STRINGING <br> ◯ <br> PEAK PRESSURE <br> ✕ |

FIG. 4C

| SHAPE OF OPENING PORTION | TEST RESULT | DETERMINATION |
|---|---|---|
| GOURD SHAPE <br><br> OPENING AREA SD: 8.24 mm² <br> SURFACE AREA SC: 12.27 mm² <br> SD/SC = 0.67 <br> SD/SN = 0.65 | STRINGING STILL OCCURRED AND SO NG | STRINGING <br> ✕ <br> PEAK PRESSURE <br> ◯ |

FIG. 4D

| SHAPE OF OPENING PORTION | TEST RESULT | DETERMINATION |
|---|---|---|
| CROSS SHAPE <br><br> OPENING AREA SD: 7.37 mm² <br> SURFACE AREA SC: 12.74 mm² <br> SD/SC = 0.58 <br> SD/SN = 0.59 | ALTHOUGH STRINGING DID NOT OCCUR, PEAK PRESSURE VARIED LARGELY | STRINGING <br> ◯ <br> PEAK PRESSURE <br> △ ~ ✕ |

STRINGING PREVENTING MEMBER AND INJECTION MOLDING APPARATUS

BACKGROUND OF THE INVENTION

1. Field of the Invention

The present invention relates to a stringing preventing member and an injection molding apparatus.

2. Description of Related Art

As described in JP-A-2001-225359, it is known that in an injection molding, when separating a molded article from molten resin within an injection molding nozzle, the resin is not cut completely from the molded article to cause stringing. When the stringing arises, it is necessary to cut a string at the time of taking out the molded article from a mold. Further, the treatment of the molded article becomes troublesome due to the string thus generated. JP-A-2001-225359 discloses a technique that the stringing can be prevented by improving the shape of the opening at the tip end of the injection molding nozzle.

Further, JP-A-2004-188951 describes a technique in which a circular concave portion is provided at the resin injection port of a spool bush adhered to the tip end of an injection molding nozzle to cause the solidification of the resin thereby to prevent the stringing.

However, according to the method described in JP-A-2001-225359, since it is necessary to process the injection molding nozzle itself, a user of the injection molding apparatus is required to specially order the manufacturer of the injection molding apparatus to process the apparatus. Thus, since the cost of the injection molding apparatus rises and the delivery period of the apparatus becomes longer, the convenience for a user degrades. Further, since the generation condition of the stringing differs depending on the resin material and the molding condition (temperature, injection pressure etc.), it is difficult to prevent the generation of the stringing in accordance with the change of the material and the molding condition by the method of processing the injection molding nozzle itself. Thus, it is desired on the user side of the injection molding apparatus to prevent the generation of the stringing in a manner that the injection molding nozzle as a functional portion of the main body of the injection molding apparatus is used as it is, then a member for preventing the generation of the stringing is prepared on the user side without depending on the manufacturer of the injection molding apparatus, and the member is exchanged in accordance with the material and the molding condition.

Further, according to the method described in JP-A-2004-188951, since a reservoir (concave portion) for the resin is provided at the tip end of the injection molding nozzle, the resin is solidified at the reservoir portion. Thus, the solidified resin may be ejected at the time of a succeeding shot and mixed into a molded article. In particular, in the case of molding a transparent lens, since the solidified resin is mixed into the molded article as a foreign material, there arises a problem that the transparency of the lens degrades and a desired efficiency can not be obtained.

SUMMARY OF THE INVENTION

An object of an illustrative, non-limiting embodiment of the invention is to provide a stringing preventing member and a injection molding apparatus, which can surly suppress the generation of the stringing.

According to an aspect of the invention, there is provided a stringing preventing member including:

a member having an opening portion through which resin injected from an injection nozzle of an injection molding apparatus is fed to a mold including a fixed mold and a movable mold; and a projection portion protruding inwardly with respect to an opening of the injection nozzle, so as to define at least a part of a contour of the opening portion, wherein a ratio of an effective opening area of the opening portion to a surface area of an inner wall surface of the opening portion contacting with the resin at an inside of the opening potion is 0.6 or less, and a ratio of the effective opening area of the opening portion to an area of the opening of the injection nozzle is 0.6 or more.

According to another aspect of the invention, there is provided an injection molding apparatus including:

an injection nozzle for injecting resin;

a mold including a fixed mold and a movable mold, the movable mold being movable with respect to the fixed mold and having a cavity for molding an article between the fixed mold and the movable mold; and a stringing preventing member having an opening portion through which the resin is fed to the mold, the stringing preventing member including a projection portion protruding inwardly with respect to an opening of the injection nozzle, so as to define at least a part of a contour of the opening portion, wherein a ratio of an effective opening area of the opening portion to a surface area of an inner wall surface of the opening portion contacting with the resin at an inside of the opening potion is 0.6 or less, and a ratio of the effective opening area of the opening portion to an area of the opening of the injection nozzle is 0.6 or more.

In the aspects above, as the surface area of the inner wall surface of the opening portion contacting with the resin at the inside of the opening portion becomes larger, the cooling property of the resin due to the stringing preventing member is further enhanced. On the other hand, the cooling property of the resin degrades as the area of the opening portion increases. Thus, when the ratio of the effective opening area of the opening portion to the surface area of the inner wall surface of the opening portion is set to an optimum value, the cooling property of the resin due to the stringing preventing member can be adjusted optimally. Thus, when the ratio of the effective opening area of the opening portion to the surface area of the inner wall surface of the opening portion is set to be 0.6 or less, such an phenomenon can be surely prevented from occurring that the stringing occurs between the molded article and the molten resin within the nozzle at the time of separating the fixed mold from the molded article. When the ratio of the effective opening area of the opening portion to the area of the opening of the injection nozzle is made smaller, the flow of the resin is interfered by the opening portion. Thus, when the ratio of the effective opening area of the opening portion to the area of the opening of the injection nozzle is set optimally, that is, when the ratio of the effective opening area of the opening portion to the area of the opening of the injection nozzle is set to be 0.6 or more, the occurrence of the molding failure can be suppressed and the injection molding can be performed surely.

Further, in the aspects above, the opening portion may be configured to include a plurality of grooves extending radially from a center thereof, and each of the projection portions may be provided between the adjacent grooves. According to such a configuration, since the opening portion is configured to include the plurality of grooves extending radially from the center thereof, and each of the projection portions is provided between the adjacent grooves, the surface area of the inner wall surface of the opening portion contacting with the resin at the inside of the opening portion can be secured to be large and so the cooling property of the resin can be enhanced.

Further, in the aspects above, the thickness of the opening portion in the flowing direction of the resin may be set to be in a range from 1 to 2 mm. When the thickness of the opening portion in the flowing direction of the resin is made small excessively, the projection portions deform due to the pressure of the resin. In contrast, when the thickness is made large excessively, the molded article hardly separate from the stringing preventing ring. Thus, according to such a configuration, when the thickness of the opening portion in the flowing direction of the resin is adjusted optimally, that is, when the thickness is set to be in the range from 1 to 2 mm, the deformation of the projection portions due to the pressure of the resin can be suppressed and the molded article can be surely separate from the stringing preventing ring.

BRIEF DESCRIPTION OF THE DRAWINGS

The features of the invention will appear more fully upon consideration of the exemplary embodiment of the invention, which are schematically set forth in the drawings, in which:

FIGS. 4A to 4D are schematic diagrams showing the investigation results representing whether or not the ringing was generated according to the respective ratios between the surface area Sc and the opening area Sd of the stringing preventing ring.

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the invention, a stringing preventing member and an injection molding apparatus which can surly suppress the generation of stringing can be provided.

Hereinafter, an exemplary embodiment of the invention will be explained in detail with reference to accompanying drawings. In the specification and drawings, constituent elements having substantially the same functional configurations are referred by the same symbols and the duplicated explanation thereof will be omitted.

Figure 1:
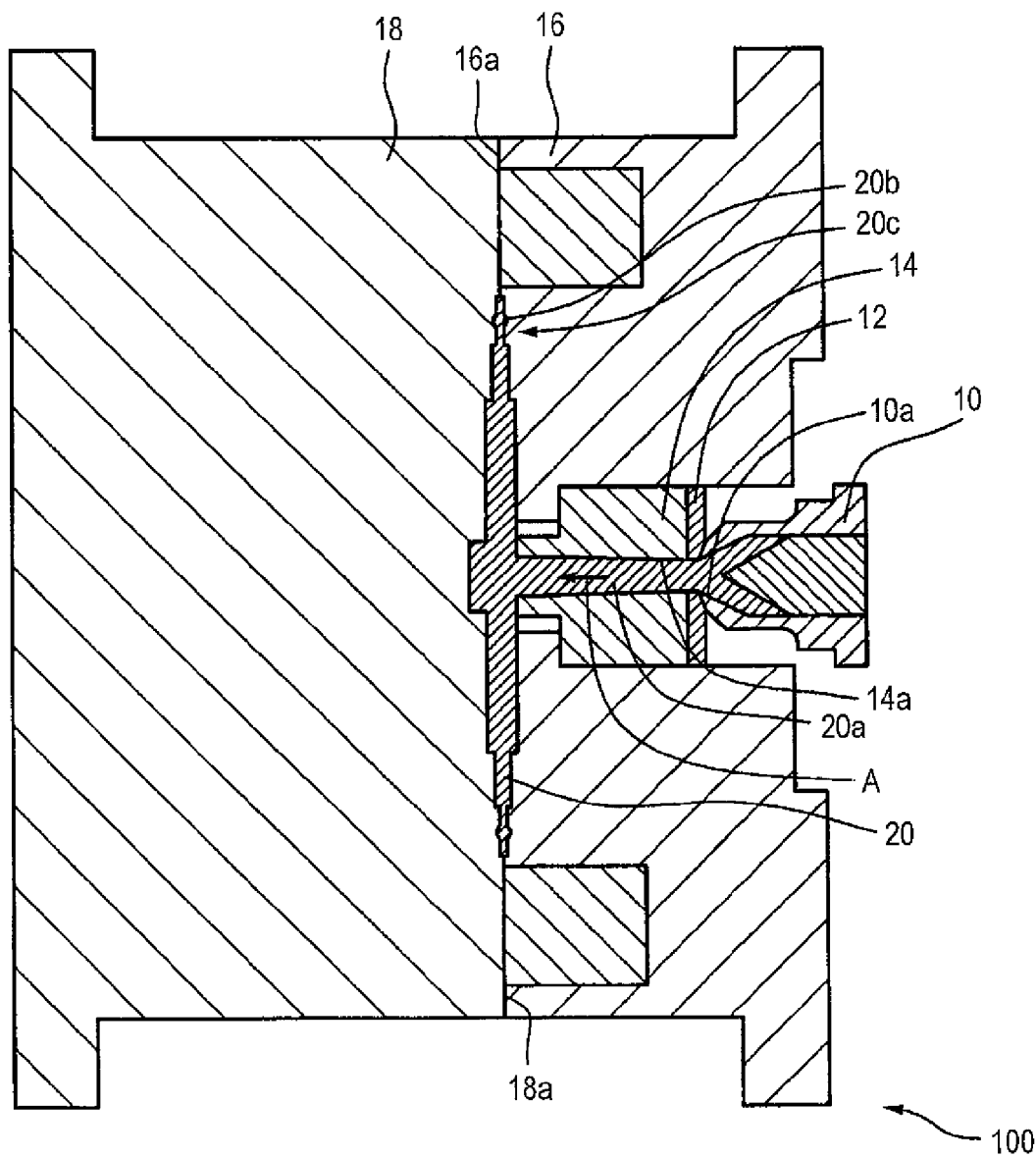
FIG. 1 is a schematic diagram showing an injection molding apparatus including a stringing preventing ring according to an exemplary embodiment of the invention.
Figure 2:
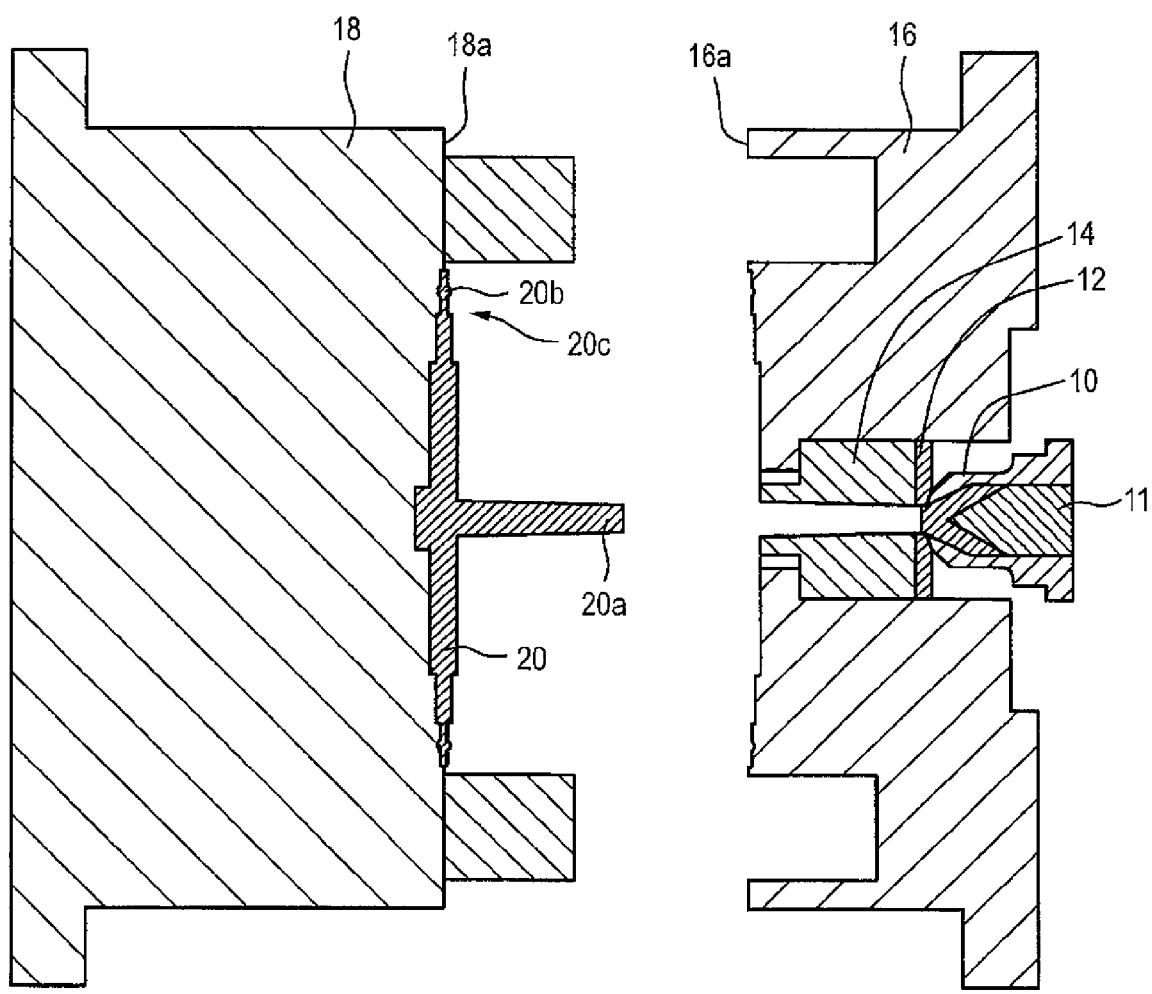
FIG. 2 is a schematic diagram showing the injection molding apparatus including the stringing preventing ring according to the embodiment.

Each of FIGS. 1 and 2 is a schematic diagram showing an injection molding apparatus 100 including a stringing preventing ring 12 according to an exemplary embodiment of the invention. As shown in FIGS. 1 and 2, the injection molding apparatus 100 is configured to include a nozzle 10, the stringing preventing ring 12, a spool bush 14, a fixed mold 16 and a movable mold 18.

FIG. 1 shows a state at the time of the injection molding. In this state, the mating face 16a of the fixed mold 16 and the mating face 18a of the movable mold 18 are adhered. In this state, molding resin is injected in an arrow A direction with a pressure from the nozzle 10, and the resin is solidified within a cavity configured by the fixed mold 16 and the movable mold 18, whereby a molded article 20 is formed. The molded article 20 is configured by a spool portion 20a and a lens portion 20b having a function as a lens.

On the other hand, FIG. 2 shows a state where the fixed mold 16 and the movable mold 18 are separated to each other. In this state, the movable mold 18 moves to the direction separating from the fixed mold 16, and the molded article 20 moves together with the movable mold 18 in a state of being attached to the movable mold 18. In this case, the solidified spool portion 20a is drawn by the movable mold 18. Thus, since the resin is molten within the nozzle 10, the spool portion 20a is cut from the molten resin within the nozzle 10 at the position of the stringing preventing ring 12 located at the boundary between the solidified resin and the molten resin.

After the movable mold 18 separates from the fixed mold 16, the molded article 20 is removed from the movable mold 18. The molded article 20 is cut at the position of a gate 20c after being removed from the movable mold 18. Thus, the lens portion 20b is separated from the spool portion 20a and so used as a molded lens.

In this embodiment, for example, amorphous polyolefin resin is used as the resin for the molded article 20. As the amorphous polyolefin resin suitable for molding a lens, there is ZEONEX (trademark) manufactured by Nippon Xeon Co., Ltd., for example. Since the amorphous polyolefin resin has a large refractive index when fabricated as a molded article and so is resin material suitable for the usage as a lens, particularly. On the other hand, the amorphous polyolefin resin has a property that due to its fluidity in a molten state, the stringing likely occurs between the end portion of the spool portion 20a and the molten resin remaining within the nozzle 10. In the embodiment, the fluidity of the amorphous polyolefin resin used as the material of the molded article 20 was almost in a range from 9 g/10 min to 21 g/10 min at the MFR (melt flow rate), wherein the measurement was performed according to JIS K6719.

In the apparatus according to the embodiment, the injection pressure at the time of injecting resin from the nozzle 10 can be adjusted almost in a range from 700 kgf/cm$^2$ to 1,000 kgf/cm$^2$ and the upper limit of the injection pressure is almost 1,000 kgf/cm$^2$.

The spool bush 14 is inserted into the fixed mold 16. The spool bush 14 is provided with a tapered hole 14a which is widened toward the movable mold 18 side. The spool portion 20a of the molded article 20 is formed by the resin injected into the hole 14a.

The tip end of the nozzle 10 is adhered to the stringing preventing ring 12. An opening 10a is provided at the tip end of the nozzle 10. The molten resin is injected from the opening 10a and filled within the cavities of the fixed mold 16 and the movable mold 18 and the hole 14a of the spool bush 14. The stringing preventing ring 12 is provided with an opening portion 12a through which the resin passes. The opening area of the opening portion 12a is formed to be smaller than that of the opening 10a at the tip end of the nozzle 10. Further, the opening area of the opening portion 12a is formed to be smaller than the opening area on the nozzle 10 side of the hole 14a of the spool bush 14.

Thus, the spool portion 20a of the molded article 20 is formed to be thinner at the position of the stringing preventing ring 12 as compared with remaining portions thereof. Further, since the thickness of the spool portion is made smaller at the position of the stringing preventing ring 12, the cooling property of the resin at this position can be improved as compared with other regions. Thus, when the movable mold 18 is opened and the spool portion 20a is pulled to the movable mold 18 side, the spool portion 20a is cut at the position of the stringing preventing ring 12 having the small thickness. Further, since the thickness of the spool portion 20a is smaller at the cut portion than the remaining portions thereof, the cooling property of the spool portion at the cut portion is good and so the resin is solidified quickly at the portion. Thus, the stringing can be surely prevented from being generated at the cut face.

Further, in this embodiment, since the stringing preventing ring 12 is configured separately from the nozzle 10 and the spool bush 14, even if the stringing preventing ring 12 is worn away due to many shots of the molding, the stringing preventing ring 12 can be exchanged easily. Further, it is possible to replace by the stringing preventing ring 12 having the opening portion 12a with an optimum shape in accordance with the resin material, the molding condition etc., whereby the generation of the stringing can be surely prevented even when the resin material or the molding condition changes. The stringing preventing ring 12 may be integrally configured with the spool bush 14.

Figure 3C:
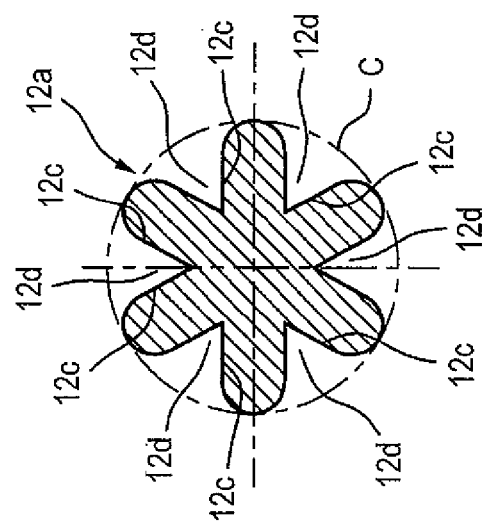
FIGS. 3A to 3C are schematic diagrams showing the configuration of the stringing preventing ring in detail.
Figure 3B:
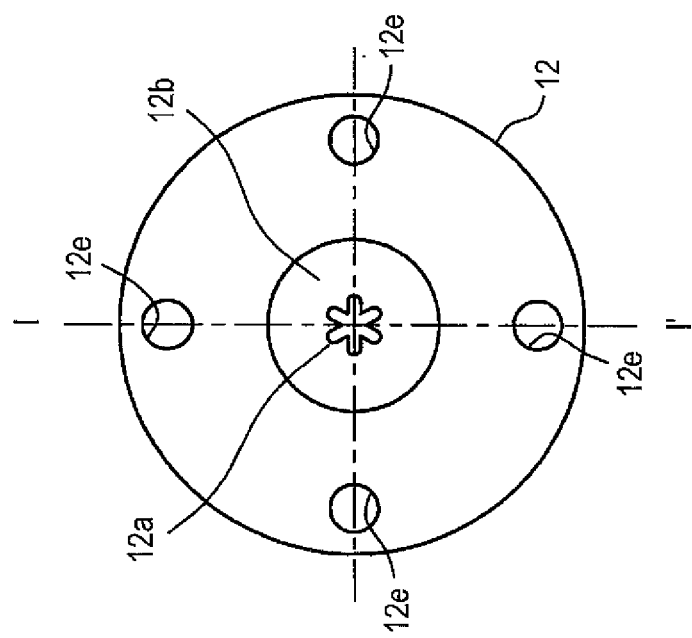
Figure 3A:
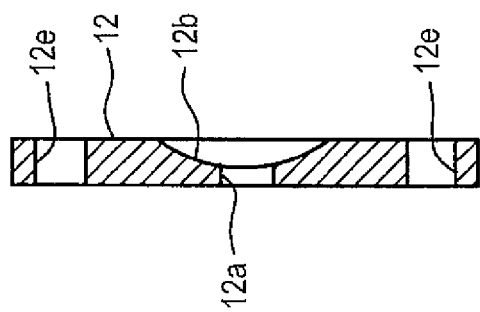

FIGS. 3A to 3C are schematic diagrams showing the configuration of the stringing preventing ring 12 in detail. FIG. 3A is a sectional diagram of the stringing preventing ring 12 like FIGS. 1 and 2. FIG. 3B is a plan view of the stringing preventing ring 12 seen from the nozzle 10 side. FIG. 3C is an enlarged plan view of the opening portion 12a shown in FIG. 3B. The section shown in FIG. 3A is cut along an alternate long and short dash line I-I' in FIG. 3B.

As shown in FIGS. 3A and 3B, the stringing preventing ring 12 is provided on the nozzle 10 side with a concave surface 12b corresponding to the curved shape of the tip end of the nozzle 10. As shown in FIGS. 1 and 2, the tip end of the nozzle 10 is disposed so as to be adhered to the concave surface 12b. The stringing preventing ring 12 is provided with screw holes 12e through which fixing screws are passed toward the spool bush 14.

As shown in FIG. 3C, the stringing preventing ring 12 is provided with grooves 12c extending from the center of the ring toward six directions equally divided in angles thereamong. The grooves 12c form the opening portion 12a of a star shape (six-pronged fork shape). The diameter of a circumscribing circle C passing the tip ends of the six grooves 12c is almost same as the diameter of the opening 10a at the tip end of the nozzle 10. Six projection portions 12d protruding inside from the circle C are formed between the six grooves 12c. The diameter of the circumscribing circle C may be larger or smaller than the diameter of the opening 10a at the tip end of the nozzle 10.

Thus, the six projection portions 12d formed between the six grooves 12c protrude inside than the inner wall of the opening 10a of the nozzle 10 and also protrude inside than the inner wall on the nozzle 10 side of the hole 14a of the spool bush 14. Thus, since the thickness of the spool portion 20a is made small by the projection portions 12d, the cooling property of the resin can be enhanced and so the generation of the stringing can be suppressed.

In FIG. 3C, when the area of the opening portion 12a is made smaller and so the projection area of the projection portions 12d within the circle C is made larger, since the thickness of the spool portion 20a is made further small by the projection portions 12d, the cooling efficiency of the resin can be promoted at the position of the stringing preventing ring 12 and so the generation of the stringing can be surely prevented.

On the other hand, when the projection area of the projection portions 12d within the circle C is made large excessively, the flow of the resin injected from the opening 10a is interfered by the projection portions 12d. When the flow of the resin is interfered largely, it is supposed that the resin can not be filled completely within the cavities of the fixed mold 16 and the movable mold 18 due to the phenomenon that the injection pressure reaches the limit value or the injection pressure varies. Thus, the projection area of the projection portions 12d within the circle C and the projection amount of the projection portions 12d are required to be set optimally in accordance with the presence or non-presence of the generation of the stringing and the flowing state of the resin at the stringing preventing ring 12.

The inventors of the present application concentrically investigated the shape and the area of the opening portion 12a of the stringing preventing ring 12 and the shape of the projection portions 12d and found that the generation of the stringing can be surely suppressed by optimally setting a ratio between the opening area (effective opening area) Sd of the opening portion 12a and the surface area Sc (contact area between the inner wall surface of the opening portion 12a and the spool portion 20a) of the inner wall surface of the opening portion 12a of the stringing preventing ring 12. The effective opening area Sd of the stringing preventing ring 12 represents the area of an opening formed by the overlapped opening area between the tip end of the nozzle 10 and the stringing preventing ring 12 when they are adhered to each other. That is, the effective opening area Sd represents the area of the opening portion 12a defined within the opening 10a at the tip end of the nozzle 10 when the convex surface at the tip end of the nozzle 10 is adhered to the concave surface 12b of the stringing preventing ring 12.

The surface area Sc of the inner wall surface of the opening portion 12a is represented by the following expression, where L represents the length of the edge of the opening portion 12a and t represents the thickness in the resin flowing direction of the stringing preventing ring 12 at the opening portion 12a.

$$Sc = L \cdot t.$$

The larger the length L of the edge of the opening portion 12a becomes, the larger the projection area of the projection portions 12d within the circle C becomes, whereby since the projection amounts of the projection portions 12d become larger, the contact area between the inner wall of the opening portion 12a and the resin constituting the spool portion 20a. Further, the larger the thickness t becomes, the larger the contact area between the inner wall of the opening portion 12a and the resin constituting the spool portion 20a. Thus, the larger the surface area Sc of the inner wall surface of the opening portion 12a becomes, the larger the contact area with the resin becomes, whereby since the cooling efficiency with respect to the resin is enhanced, the generation of the stringing can be suppressed. In this manner, since the surface area Sc of the inner wall surface of the opening portion 12a becomes a parameter representing the contribution to the cooling, the generation of the stringing can be surely suppressed by optimally adjusting the surface area Sc of the inner wall surface of the opening portion 12a.

On the other hand, the larger the opening area Sd of the opening portion 12a of the stringing preventing ring 12 becomes, the larger the thickness of the spool portion 20a at the position of the stringing preventing ring 12 becomes, whereby the cooling efficiency of the resin is degraded. Thus, since it is necessary to take the opening area Sd as well as the surface area Sc into consideration in order to enhance the cooling property of the resin and prevent the generation of the stringing, it is necessary to optimally set the ratio between the surface area Sc and the opening area Sd.

FIGS. 4A to 4D are schematic diagrams showing the investigation results representing whether or not the ringing was generated according to the respective ratios between the surface area Sc and the opening area Sd. A plurality of shapes are prepared as the shape of the opening portion 12a of the stringing preventing ring 12, and these figures show the test results and determination results with respect to the respective shapes. The test results evaluate whether or not the ringing was generated and also evaluate the change of the injection pressure of the injection molding apparatus 100, as to each of the respective shapes.

FIG. 4A shows the result in the case of the opening portion 12a of the stringing preventing ring 12 according to the embodiment shown in FIG. 3. FIG. 4B shows the result in the case where the opening portion 12a was configured in a three-pronged fork shape, FIG. 4C shows the result in the case where the opening portion 12a was configured in a gourd shape, and FIG. 4D shows the result in the case where the opening portion 12a was configured in a cross shape. In each of FIGS. 4A to 4D, the thickness t in the resin flow direction of the stringing preventing ring 12 at the opening portion 12a was set to 1.5 mm. Further, the diameter (diameter of the circumscribing circle C of the opening portion 12a) of the portion 10a of the nozzle 10 was set to 4 mm. Further, in FIG. 4, the aforesaid amorphous polyolefin resin was used as the resin material.

In the stringing preventing ring 12 according to the embodiment shown in FIG. 4A, the opening area Sd was 9.96 mm$^2$ and the surface area Sc was 19.43 mm$^2$. Thus, the ratio of the opening area Sd to the surface area Sc was as follows.

$$Sd/Sc = 9.96/19.43 = 0.51$$

In the case of the three-pronged fork shape shown in FIG. 4B, the opening area Sd was 5.41 mm$^2$ and the surface area Sc was 10.82 mm$^2$. Thus, the ratio of the opening area Sd to the surface area Sc was as follows.

$$Sd/Sc = 5.41/10.82 = 0.50$$

In the case of the gourd shape shown in FIG. 4C, the opening area Sd was 8.24 mm$^2$ and the surface area Sc was 12.27 mm$^2$. Thus, the ratio of the opening area Sd to the surface area Sc was as follows.

$$Sd/Sc = 8.24/12.27 = 0.67$$

In the case of the cross shape shown in FIG. 4D, the opening area Sd was 7.37 mm$^2$ and the surface area Sc was 12.74 mm$^2$. Thus, the ratio of the opening area Sd to the surface area Sc was as follows.

$$Sd/Sc = 7.37/12.74 = 0.58$$

The investigation was made as to the presence of the stringing at the opening portion 12a in each of the respective shapes shown in FIGS. 4A to 4D, and it was proved that the stringing did not occur in the case of the opening portion 12a according to the embodiment shown in FIG. 4A. Also the stringing did not occur in the case of each of the opening portions 12a shown in FIGS. 4B and 4D. In contrast, the stringing occurred in the case of the opening portion 12a shown in FIG. 4C.

As shown in FIG. 4C, when the ratio of the opening area Sd to the surface area Sc exceeds 0.6, the ratio of the surface area Sc to the opening area Sd of the opening portion 12a becomes small. Thus, since the projection area of the projection portions 12d becomes small, the outer diameter of the spool portion 20a can not be restricted sufficiently. As a result, it is considered that since the cut portion of the spool portion 20a can not be cooled sufficiently, the stringing occurs.

In view of the aforesaid results, it was proved that the generation of the stringing can be suppressed when the ratio of the opening area Sd to the surface area Sc is set to be equal to or smaller than 0.6 (60%), and more preferably, when the ratio of the opening area Sd to the surface area Sc is set to be equal to or smaller than 50%, the cooling effects at the cut portion can be enhanced and so the generation of the stringing can be suppressed surely.

On the other hand, in the cases of FIGS. 4B and 4D, although the stringing did not occur, there arose problems that the peak value of the injection pressure became excessively large and the injection pressure varied. In the case of FIG. 4B, the peak value of the injection pressure reached the limit value (1,000 kgf/cm$^2$) at the time of molding the molded article 20, and the resin could not be injected sufficiently within the molds even in the state of the limit value.

Further, in the case of FIG. 4D, the degree of the variance of the peak value of the injection pressure became large at the time of molding the molded article 20, and so the molding failure occurred and the molding could not performed stably.

In each of the cases of FIGS. 4B and 4D, it is considered that since the opening area Sd of the opening portion 12a was excessively small as compared with the area of the opening 10a of the nozzle 10, the flow of the resin was obstructed to a large extent by the projection portions 12d and so the peak value of the injection pressure reached the limit value and the injection pressure varied.

In view of this facts, as shown in FIG. 4, in addition to the ratio (Sd/Sc) of the opening area Sd to the surface area Sc, the investigation was made as to a ratio (Sd/Sn) of the opening area Sd of the opening portion 12a to the area Sn (the opening area on the nozzle 10 side of hole 14a of the spool bush 14) of the opening 10a of the nozzle 10 as a second evaluation value. The area Sn of the opening 10a is determined as follows since the diameter of the opening 10a is 4 mm.

$$\Pi r^2 = 2 \cdot 2 \cdot \Pi = 12.5 \text{ mm}$$

As a result, the ratio of the opening area Sd of the opening portion 12a to the area Sn of the opening 10a of the nozzle 10 was 0.43 in the case of FIG. 4B, and the ratio of the opening area Sd of the opening portion 12a to the area Sn of the opening 10a of the nozzle 10 was 0.59 in the case of FIG. 4D. In each case, the ratio of the opening area Sd of the opening portion 12a to the area Sn of the opening 10a was less than 0.6 (60%).

On the other hand, in the cases of FIGS. 4A and 4C where the ratio of the opening area Sd of the opening portion 12a to the area Sn of the opening 10a was equal to or larger than 0.6 (60%), the peak value of the injection pressure was normal and so no failure molded article 20 was generated.

According to the aforesaid results, it was proved that in order to prevent the interference with respect to the flow of the resin by the projection portions 12d and to stabilize the injection pressure thereby not to cause the molding failure, the ratio of the opening area Sd of the opening portion 12a to the area Sn of the opening 10a is required to be equal to or larger than 0.6 (60%), preferably, equal to or larger than 0.7 (70%).

According to the determination results of FIG. 4, good results could be obtained in both the generation of the stringing and the injection pressure only in the case of the shape of the opening portion 12a according to the embodiment shown in FIG. 4A. Further, there arose no aberration in the lens 20b molded by using the opening portion 12a according to the embodiment.

As another condition, the thickness t of the stringing preventing ring 12 at the opening portion 12a is preferably 1.0 mm or more. This is because in the case where the injection pressure is set in a normal range almost from 700 kgf/cm$^2$ to 1,000 kg f/cm$^2$, if the thickness t is small than 1.0 mm, it was confirmed that the projection portions 12d are deformed by the pressure applied to the projection portions 12d. Thus, the deformation of the projection portions 12d can be surely suppressed by setting the thickness t to be 1.0 mm or more.

Further, the thickness t of the stringing preventing ring 12 at the opening portion 12a is preferably 2.0 mm or less. This is because since the inner wall of the opening portion 12a of the stringing preventing ring 12 has a straight shape in parallel to the flow direction of the resin, if the thickness t exceeds 2.0 mm, it was confirmed that the spool portion 20a hardly separates from the inner wall of the opening portion 12a at the time of separating the movable mold 18, and so the movable mold 18 may be opened in a state that the molded article 20 is attached to the fixed mold 16. In this case, the molded article 20 is not cut from the molten resin and so the process stops. Thus, when the thickness t of the projection portions is set to be 2.0 mm or less, the molded article 20 can be surely removed in a state that the molded article 20 is attached on the movable mold 18 side.

As described above, according to the embodiment, when the ratio between the opening area Sd of the opening portion 12a and the surface area Sc of the inner wall surface of the opening portion 12a of the stringing preventing ring 12 is set optimally and the ratio of the opening area Sd to the surface area Sc is set to be 50% or less, the cooling efficiency of the resin at the cut portion of the spool portion 20a can be enhanced thereby to surely suppress the generation of the stringing.

Further, when the ratio of the opening area Sd of the opening portion 12a of the stringing preventing ring 12 to the area Sn of the opening 10a of the nozzle 10 is set optimally and the ratio of the opening area Sd of the opening portion 12a to the area Sn is set to be 0.7 (70%) or more, the degree of the interference with respect to the flow of resin by the opening portion 12a can be suppressed to the minimum, whereby the injection pressure can be stabilized and the generation of the molding failure can be suppressed.

As described above, although the explanation is made as to the preferred embodiment of the invention, of course, the present invention is not limited to the embodiment. It will be apparent that those skilled in the art will be able to think of various kinds of changed examples and modified examples within the scope described in claims, and it will be understood that of course such examples also belong to the technical range of the invention.

This application claims foreign priority from Japanese Patent Application No. 2007-95154, filed Mar. 30, 2007, the entire disclosure of which is herein incorporated by reference.

What is claimed is:

1. A stringing preventing member comprising:
a member having an opening portion through which resin injected from an injection nozzle of an injection molding apparatus is fed to a mold including a fixed mold and a movable mold; and
a projection portion protruding inwardly with respect to an opening of the injection nozzle, so as to define at least a part of a contour of the opening portion,
wherein a ratio of an effective opening area of the opening portion to a surface area of an inner wall surface of the opening portion contacting with the resin at an inside of the opening portion is 0.6 or less, and
a ratio of the effective opening area of the opening portion to an area of the opening of the injection nozzle is 0.6 or more.

2. The stringing preventing member according to claim 1, wherein the opening portion is configured to include a plurality of grooves extending radially from a center thereof, and the projection portion is provided between the grooves adjacent thereto.

3. The stringing preventing member according to claim 1, wherein a thickness of the opening portion in a flowing direction of the resin is 1 to 2 mm.

4. An injection molding apparatus comprising:
an injection nozzle for injecting resin;
a mold including a fixed mold and a movable mold, the movable mold being movable with respect to the fixed mold and having a cavity for molding an article between the fixed mold and the movable mold; and
a stringing preventing member having an opening portion through which the resin is fed to the mold, the stringing preventing member including a projection portion protruding inwardly with respect to an opening of the injection nozzle, so as to define at least a part of a contour of the opening portion,
wherein a ratio of an effective opening area of the opening portion to a surface area of an inner wall surface of the opening portion contacting with the resin at an inside of the opening portion is 0.6 or less, and
a ratio of the effective opening area of the opening portion to an area of the opening of the injection nozzle is 0.6 or more.

5. The stringing preventing member according to claim 4, wherein the opening portion is configured to include a plurality of grooves extending radially from a center thereof, and the projection portion is provided between the grooves adjacent thereto.

6. The stringing preventing member according to claim 4, wherein a thickness of the opening portion in a flowing direction of the resin is 1 to 2 mm.

7. The stringing preventing member according to claim 1, wherein the resin comprises an amorphous polyolefin resin with a fluidity in the range of 9 g/10 min to 21 g/10 min.

8. The stringing preventing member according to claim 1, wherein the resin is injected from the injection nozzle through the opening portion at an injection pressure in the range of 700 kgf/cm$^2$ to 1000 kgf/cm$^2$.

9. The injection molding apparatus according to claim 4, wherein the resin comprises an amorphous polyolefin resin with a fluidity in the range of 9 g/10 min to 21 g/10 min.

10. The injection molding apparatus according to claim 4, wherein the resin is injected from the injection nozzle through the opening portion at an injection pressure in the range of 700 kgf/cm$^2$ to 1000 kgf/cm$^2$.

11. The injection molding apparatus according to claim 4, further comprising:
a spool bush member insertable into the fixed mold and provided with a tapered hole through which the resin is injected into the mold so as to form the article, wherein a spool portion of the article is formed by the resin hardened within the tapered hold of the spool bush member.

12. The injection molding apparatus according to claim 11, wherein the stringing preventing member is configured separately from the injection nozzle and spool bush member.

13. The injection molding apparatus according to claim 11, wherein the stringing preventing member is integrally configured with the spool bush member.

14. The stringing preventing member according to claim 2, wherein the plurality of grooves form a six-pronged fork shape.

15. The stringing preventing member according to claim 4, wherein the plurality of grooves form a six-pronged fork shape.

* * * * *